United States Patent
Watanabe et al.

(10) Patent No.: US 7,764,430 B2
(45) Date of Patent: Jul. 27, 2010

(54) DISPLAY DEVICE FOR VEHICLE AND SUPPORTING METHOD FOR ADJUSTING DISPLAY POSITION THEREOF

(75) Inventors: Takeyoshi Watanabe, Susono (JP); Daisuke Satsukawa, Susono (JP); Tetsuya Sugiyama, Susono (JP); Masahiro Takamatsu, Toyota (JP); Koji Nomura, Toyota (JP); Hitoshi Kumon, Toyota (JP)

(73) Assignees: Yazaki Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/987,205

(22) Filed: Nov. 28, 2007

(65) Prior Publication Data
US 2008/0212196 A1    Sep. 4, 2008

(30) Foreign Application Priority Data
Dec. 1, 2006    (JP)    ............................. 2006-325598

(51) Int. Cl.
G02B 27/14    (2006.01)
H04N 7/00    (2006.01)
G03B 21/14    (2006.01)
G01C 21/00    (2006.01)

(52) U.S. Cl. ........................ 359/630; 348/115; 353/119; 340/980

(58) Field of Classification Search ......... 359/630–634, 359/13–14; 345/7, 9; 348/115; 349/11; 353/11–12, 28, 119; 340/438, 980, 995.1, 340/815.47, 815.74
See application file for complete search history.

(56) References Cited

U.S. PATENT DOCUMENTS

2005/0162340 A1*  7/2005  Nagano et al. ............... 345/7
2007/0115205 A1*  5/2007  Uchiyama ..................... 345/7

FOREIGN PATENT DOCUMENTS

DE    43 38 579    7/1994
DE    198 13 300    10/1999

(Continued)

OTHER PUBLICATIONS

German Patent Office Official Communication, May 9, 2008, issued in DE 10 2007 057 695.3.

*Primary Examiner*—Scott J Sugarman
*Assistant Examiner*—Dawayne A Pinkney
(74) *Attorney, Agent, or Firm*—Kratz, Quintos & Hanson, LLP

(57) ABSTRACT

A display device for a vehicle is provided, by which a driver of the vehicle is free from a trouble of adjusting a display position of the virtual image without cost-up of the device. When the support start detecting means detects a support start timing of adjusting a reflection angle, for example, a timing of an operation of an operation switch or a start of an operation, the rotation control means controls the rotating means so that the reflecting member having a reflection angle indicated by the reflection angle data stored in the reflection angle data storing means is (a) rotated within an adjustment supporting range on a condition that the reflecting member is reflecting the display light from the display source and (b) returned to a reflection angle indicated by the reflection angle data.

3 Claims, 4 Drawing Sheets

FOREIGN PATENT DOCUMENTS

| | | |
|---|---|---|
| DE | 100 44 221 | 4/2001 |
| JP | H7-266925 | 10/1995 |
| JP | 10-329579 | 12/1998 |
| JP | 2001-097073 | 4/2001 |
| JP | 2002-307977 | 10/2002 |
| JP | 2003-335148 | 11/2003 |
| JP | 2004-090713 | 3/2004 |
| JP | 2006-015941 | 1/2006 |

* cited by examiner

DISPLAY DEVICE FOR VEHICLE AND SUPPORTING METHOD FOR ADJUSTING DISPLAY POSITION THEREOF

BACKGROUND OF THE INVENTION (1) Field of the Invention

The present invention relates to a display device for a vehicle, in which (a) a virtual image of an image projected on a projection area of a windshield of the vehicle, onto which area the image displayed on a display source is reflected by a reflecting member and (b) a front view of the vehicle to be seen from an eye point of the vehicle through the windshield are seen in a superimposed manner, and to a supporting method for adjusting a display position thereof.

(2) Description of the Related Art

Recently, accompanied with increment and diversification of information required by a driver during a drive of a vehicle, in order to improve visibility, a projection type display device for a vehicle being called a head up display device (HUD device) has been adopted, in which an image is displayed as a virtual image thereof on a windshield of the vehicle and subjected to be seen by the driver in a superimposed manner together with a front view of the vehicle through the windshield. So far, the HUD device has been provided with a mechanism for adjusting a position of a display image in order to assure that the driver can see the display image even when an eye point of the driver shifts within an eye range.

The following examples are known as a HUD device including such a mechanism for adjusting a position of a display image. A HUD device described in Japanese Patent Application Laid-Open No. H7-266925 includes: a reflecting member for reflecting light from a light source passing through a display indicator on a reflecting surface by a predetermined angle; and a motor for adjusting an angle in an up-and-down direction of the reflecting surface of the reflecting member, thereby enabling the adjustment of the angle.

A HUD device described in Japanese Patent Application Laid-Open No. 2002-307977 includes a control switch for carrying out a positional adjustment of a display image, so that a mark by which a display range of a display image can be seen is displayed when the switch is operated, thereby supporting the positional adjustment.

However, when a driver, whose display position setting is different from that of a former different driver, uses the HUD device, there is a possibility that the display image is partly missing or that nothing can be seen by the driver. In order to solve this problem, according to a HUD device described in Japanese Patent Application Laid-Open No. 2006-15941, a reflection angle of the reflecting member is detected, a reflection point corresponding to the reflection angle is specified, and a positional relation between the reflection point and an eye range is displayed, so that a driver can easily judge a method of adjusting the reflecting member even when a situation, in which nothing can be seen by the driver, takes place.

However, the HUD device described in Japanese Patent Application Laid-Open No. 2006-15941 needs to include a positional relation display means, by which a positional relation between the reflection point and an eye range is displayed. The solution by using such a HUD device having the positional relation display means only for the adjustment of the reflecting member is not realistic taking a necessary cost thereof into consideration. Accordingly, when trying to solve the problem that it is difficult to adjust a display position satisfying the driver's desire, there is still a problem of cost-up and again, when a driver, whose display position setting is different from that of a former different driver, uses the HUD device, there is a possibility that the display image is partly missing or that nothing can be seen by the driver.

SUMMARY OF THE INVENTION

It is therefore an objective of the present invention to solve the above problem and to provide a display device for a vehicle, by which a driver of the vehicle is free from a trouble of adjusting a display position of the virtual image without cost-up of the device.

In order to attain the above objective, the present invention is to provide a display device for a vehicle including:

a display source displaying an image to be seen by a driver;

a reflecting member, a reflection angle of which is adjustable so as to reflect a display light of an image displayed by the display source toward a point within an eye range indicating a range, within which the image is visible to the driver even when an eye point of the driver shifts;

a rotating means for rotating the reflecting member;

a reflection angle data storing means for storing reflection angle data indicating a reflection angle at which the reflecting member is set up;

a support start detecting means for detecting a support start timing of adjusting a reflection angle indicated by the reflection angle data stored by the reflection angle data storing means; and a rotation control means for controlling the rotating means so as to allow the reflecting member, which is reflecting the display light from the display source, (a) to rotate within a predetermined adjustment supporting range and (b) to return to a reflection angle indicated by the reflection angle data stored by the reflection angle data storing means, in response to the detection of the support start timing by the support start detecting means.

With the construction described above, when the support start detecting means detects a support start timing of adjusting a reflection angle, for example, a timing of an operation of an operation switch or a start of an operation, the rotation control means controls the rotating means so that the reflecting member having a reflection angle indicated by the reflection angle data stored in the reflection angle data storing means is (a) rotated within an adjustment supporting range on a condition that the reflecting member is reflecting the display light from the display source and (b) returned to a reflection angle indicated by the reflection angle data. Thereby, since the reflecting member rotates within the adjustment supporting range, therefore the display light reflected by the reflecting member can also be moved within a range corresponding to the adjustment supporting range. As a result, the driver of the vehicle can be supported as to recognition of a display position of a virtual image, therefore the driver can be free from a trouble of adjusting a display position of the virtual image without complication and cost-up of the device.

The adjustment supporting range is an adjustable range, which corresponds to the eye range and within which the reflecting member is adjustable, wherein the rotation control means controls the rotating means so as to rotate the reflecting member throughout the entire adjustable range.

With the construction described above, since the rotating means is controlled to make the reflecting member rotate throughout the entire adjustable range, which corresponds to the eye range and within which the reflecting member is adjustable, therefore the display light moves throughout the entire adjustable range. That is, since the driver can see the entire range in which the image can be displayed, therefore the device can precisely support the adjustment of the display position to the driver.

In order to attain the above objective, the present invention is also to provide a supporting method for adjusting a display position of a display device for a vehicle including: a display source displaying an image to be seen by a driver; a reflecting member, a reflection angle of which is adjustable so as to reflect a display light of an image displayed by the display source toward a point within an eye range indicating a range, within which the image is visible to the driver even when an eye point of the driver shifts; and a rotating means for rotating the reflecting member, the supporting method including the steps of:

detecting a support start timing of adjusting a reflection angle at which the reflecting member is set up; and controlling the rotating means so as to allow the reflecting member, which is reflecting the display light from the display source, (a) to rotate within a predetermined adjustment supporting range and (b) to return to a reflection angle at which the reflecting member is set up, in response to the detection of the support start timing.

With the method described above, the rotating means is controlled so that when a support start timing of adjusting a reflection angle, for example, a timing of an operation of an operation switch or a start of an operation, is detected, the reflecting member is (a) rotated within an adjustment supporting range on a condition that the reflecting member is reflecting the display light from the display source and (b) returned to a reflection angle set up before the support. Thereby, since the reflecting member rotates within the adjustment supporting range, therefore the display light reflected by the reflecting member can also be moved within a range corresponding to the adjustment supporting range. As a result, the driver of the vehicle can be supported as to recognition of a display position of a virtual image, therefore the driver can be free from a trouble of adjusting a display position of the virtual image without complication and cost-up of the device.

DESCRIPTION OF THE PREFERRED EMBODIMENTS

Figure 1:
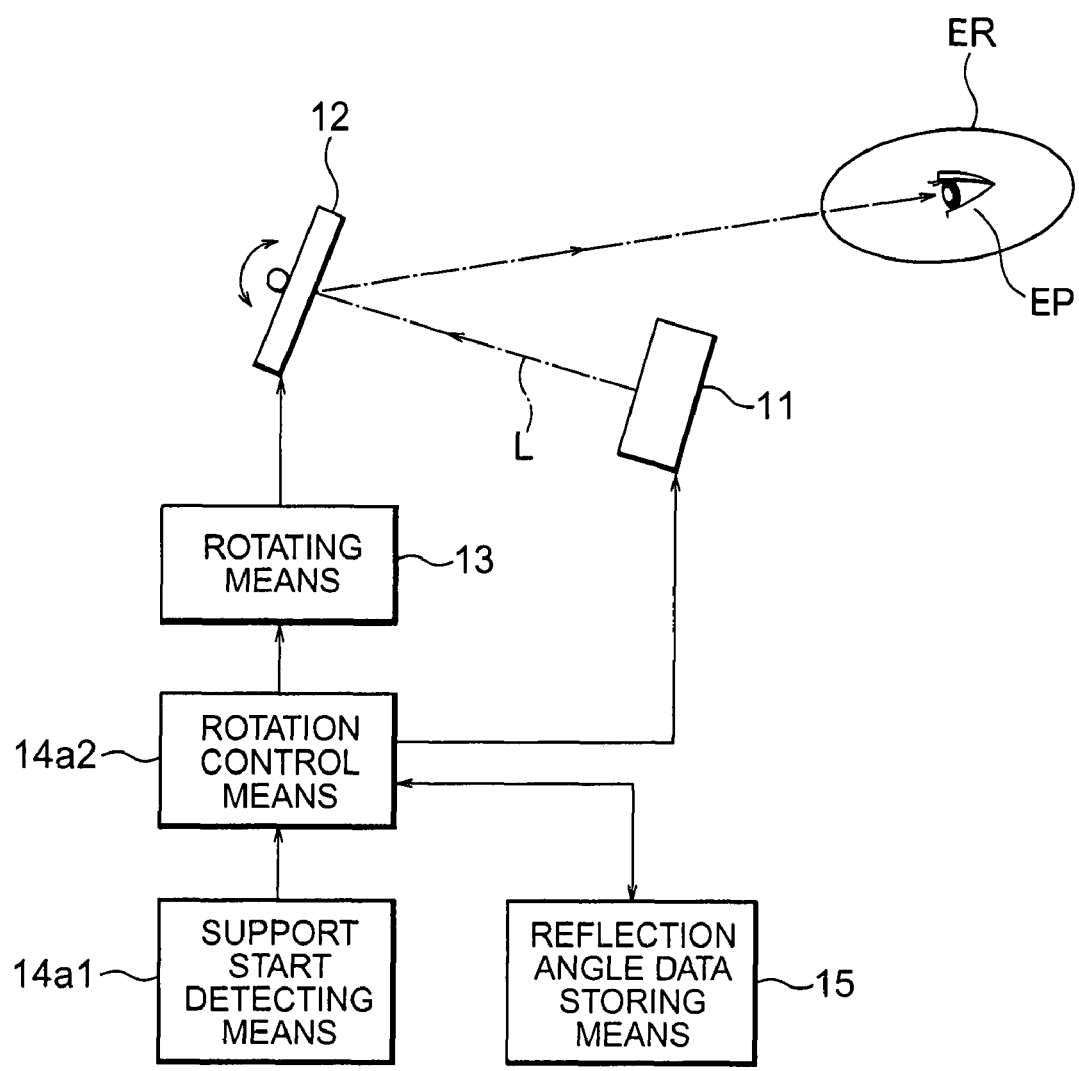
FIG. 1 illustrates a basic construction of a display device for a vehicle according to the present invention.

In the following, a projection type display device for a vehicle according to a preferred embodiment of the present invention will be explained with reference to FIGS. 1-3.

Figure 2:
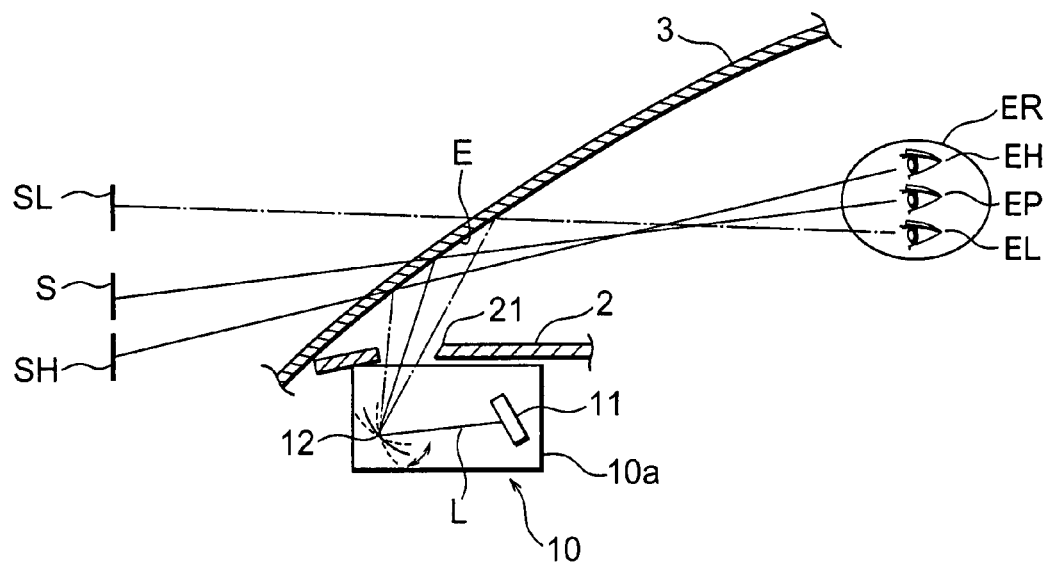
FIG. 2 illustrates a relation between a display device for a vehicle according to the present invention and the vehicle.
Figure 3:
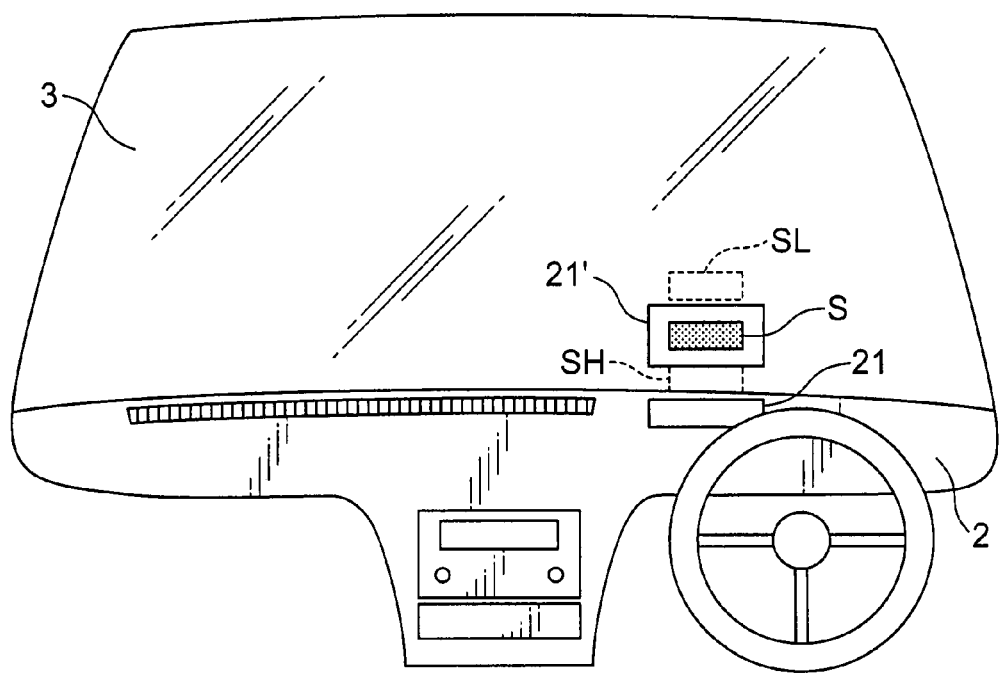
FIG. 3 illustrates a display example displayed on a windshield of a vehicle.
Figure 4:
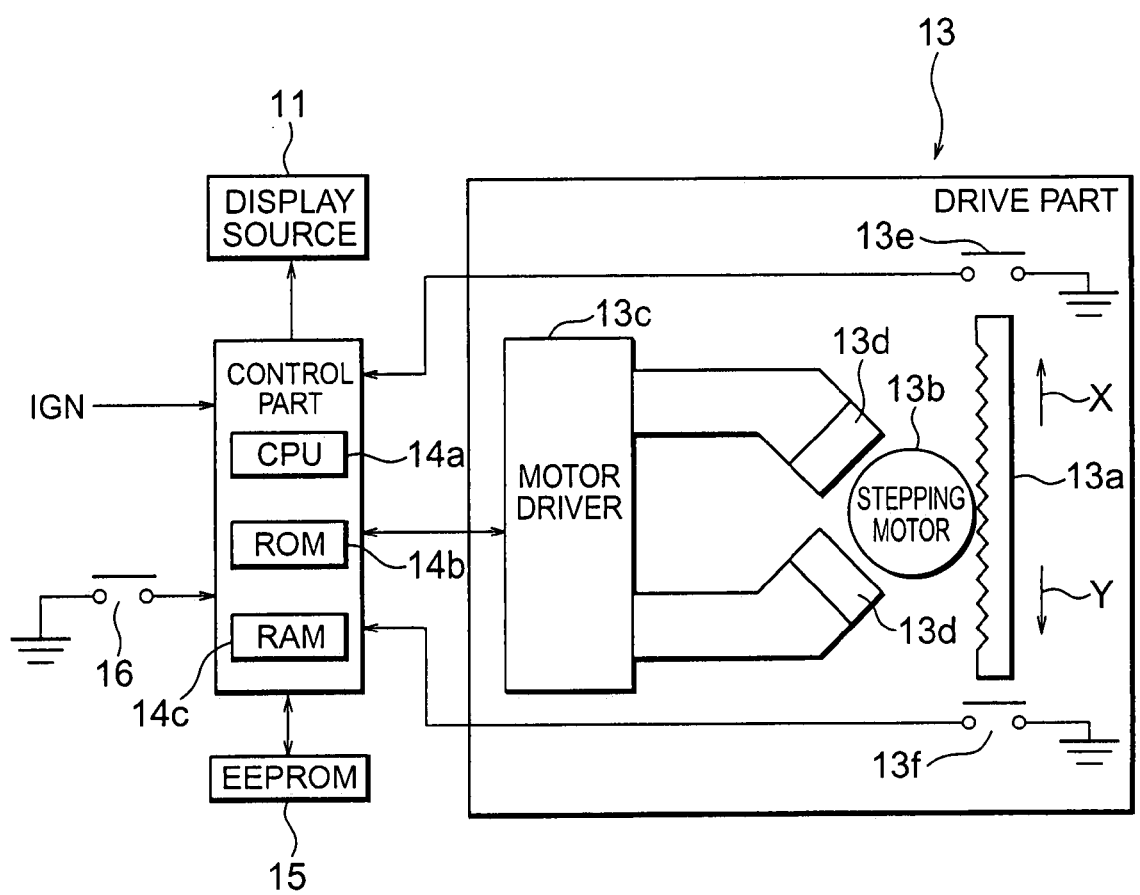
FIG. 4 illustrates an example of an outline structure of the display device for a vehicle according to the present invention.

Referring to FIGS. 2-4, a display device 10 for a vehicle includes a display source 11, reflecting member 12, drive part 13 as the rotating means, and control part 14, all of which are received in a receiving case 10a. The display device 10 is disposed in an instrument panel 2 of the vehicle.

A virtual image S of an image projected on a projection area E of a windshield 3 of the vehicle from an opening 21 of the instrument panel 2 as to display light L of the display device 10 and a front view of the vehicle to be seen from an eye point EP of a driver of the vehicle through the windshield 3 are seen in a superimposed manner as shown in FIG. 3. A reflection 21' of the opening 21 of the instrument panel 2 is reflected on the windshield 3.

The display source 11 is a display device, for example, a selfluminous device such as a field emission (FE) display, fluorescence display tube and electroluminescence (EL) display or liquid crystal display having a back light. The display source 11 is connected to the control part 14 and displays various information required by the control part 14.

The reflecting member 12 is, for example, a magnifying mirror and reflects the display light L of the image displayed on the display source 11 toward the projection area E of the windshield 3 of the vehicle. The reflecting member 12 is supported by a restriction member (not shown in the figure) rotatably within a predetermined rotation range so that a reflection angle of reflection of the display light L of an image displayed by the display source 11 toward a point within an eye range ER indicating a range, within which the virtual image S can be seen, can be adjusted even when the eye point EP of the driver shifts.

The drive part 13 includes a transmission member 13a, stepping motor 13b, motor driver 13c, pair of coils 13d, upper limiting switch 13e, and lower limiting switch 13f.

The transmission member 13a transmits power for rotating the reflecting member 12 by converting an output of the stepping motor 13b. The stepping motor 13b acts being controlled by the motor driver 13c. When the stepping motor 13b rotates in a positive rotational direction or negative rotational direction so as to move the transmission member 13a in an upper limitation direction X or a lower limitation direction Y.

The motor driver 13c acts in response to a requirement from the control part 14 and rotates the stepping motor 13b by controlling current flowing into the pair of the coils 13d. The pair of the coils 13d excites the stepping motor 13b with electric power supplied from the motor driver 13c.

The upper limiting switch 13e is connected to the control part 14. When the upper limiting switch 13e is pressed by an end part of the transmission member 13a, which is moved to the upper limitation direction X, the upper limiting switch 13e is switched from an off-condition to an on-condition. Likewise, the lower limiting switch 13f is connected to the control part 14. When the lower limiting switch 13f is pressed by an end part of the transmission member 13a, which is moved to the lower limitation direction Y, the lower limiting switch 13f is switched from an off-condition to an on-condition.

The control part 14 constructed as described above rotates the reflecting member 12 in response to an output of the stepping motor 13b driven by the control of the control part 14. When the reflection angle of the reflecting member 12 reaches an upper limit it corresponding to the upper limit eye point EH shown in FIG. 2, the upper limiting switch 13e is in the on-condition. When the reflection angle of the reflecting member 12 reaches a lower limit corresponding to the lower limit eye point EL shown in FIG. 2, the lower limiting switch 13f is n the on-condition.

The control part 14 includes a central processing unit (CPU) 14a performing various processing and control according to a predetermined program, a ROM 14*b* which is a memory for readout installing a program for the CPU 14*a*, and a RAM 14*c* which is a memory capable of readout and writing having an area required for the processing of the CPU 14*a* and installs various data.

The control part 14 is connected to; an EEPROM 15, which is capable of retaining various installed data even when the electric power supply is cut and is for readout capable of electrical deleting and rewriting having various installing area required for the processing of the CPU 14*a*; an ignition (IGN) switch of the vehicle; an operation switch 15; and so on.

The ROM 14*b* stores various program for working the CPU 14*a* as various means such as the support start detecting means and the rotation control means. The EEPROM 15 stores reflection angle data n indicating a reflection angle set up in the reflecting member 12 as an initial value and so on. The EEPROM 15 may be in an embodiment different from the above.

In the preferred embodiment, the adjustable range, which is corresponding to the eye range ER and within which the reflecting member 12 is adjustable, is divided into a plurality of graded step positions having the same interval therebetween, wherein the step positions are controlled by a count value. The count value corresponding to the reflection angle set up in the reflecting member 12 is set up as a set-up count value in the reflection angle data n.

As shown in FIGS. 2 and 3, the adjustable range is set up as a range of from the upper limit eye point EH to the lower limit eye point EL, that is, a range of from an upper limit virtual image SH to a lower limit virtual image SL. Then, this adjustable range is set up as the adjustment supporting range in advance. The adjustment supporting range may be set up at will. For example, the adjustment supporting range may be set up having the reflection angle indicated by the reflection angle data n as the standard.

In the following, an example of an initialization processing performed by a CPU 14*a* to support the adjustment of the reflection angle of the reflecting member 12 carried out by the driver of the vehicle will be explained with reference to a flow chart shown in FIG. 5.

Figure 5:
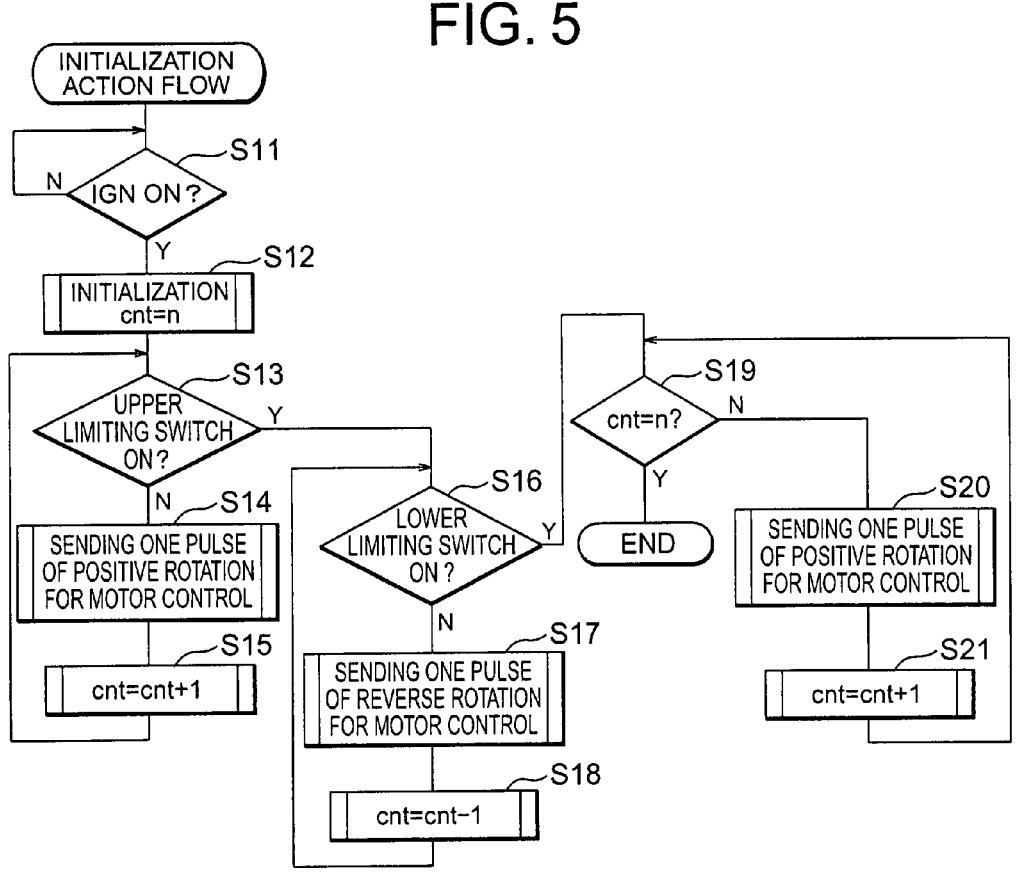
FIG. 5 is a flow chart illustrating an example of an initialization processing performed by a CPU shown in FIG. 4.

When the initialization processing shown in FIG. 5 is performed by the CPU 14*a* in response to the electric power supply to the display device 10 for a vehicle, at step S11 it is judged whether or not the IGN switch of the vehicle is turned on. When judged not turned on (N at step S1), this judging processing is repeated until the IGN switch is turned on. On the other hand, when judged turned on (Y at step S11), the CPU 14*a* advances to step S12.

When the initialization is carried out at step S12, the set count value set up in the reflection angle data n of the EEPROM 15 is set up a counter cnt and thereafter, the CPU 14*a* advances to step S13.

At step S13, it is judged whether or not the upper limiting switch 13*e* is in the on-condition. When judged not in the on-condition (N at step S13), at step S14 a pulse signal requiring a rotation in the positive direction by one step as described above is sent to the motor driver 13*c*, so that the stepping motor 13*b* is rotated so as to rotate the reflecting member 12 toward the upper limit by one step and thereafter, at step S15 the counter cnt is increased to be (cnt+1) and then, the CPU 14*a* returns to step S13 so that the series of the processing is repeated until the upper limiting switch 13*e* is in the on-condition, that is, until the reflecting member 12 reaches the upper limit of the adjustment supporting range.

At step S13, when it is judged that the upper limiting switch 13*e* is in the on-condition (Y at step S13), at step S16 it is judged whether or not the lower limiting switch 13*f* is in the on-condition. When judged not in the on-condition (N at step S16), at step S17 a pulse signal requiring a rotation in the reverse direction by one step as described above is sent to the motor driver 13*c*, so that the stepping motor 13*b* is rotated so as to rotate the reflecting member 12 toward the lower limit by one step and thereafter, at step S18 the counter cnt is decreased to be (cnt−1) and then, the CPU 14*a* returns to step S16 so that the series of the processing is repeated until the lower limiting switch 13*f* is in the on-condition, that is, until the reflecting member 12 reaches the upper limit of the adjustment supporting range.

At step S16, when it is judged that the lower limiting switch 13*f* is in the on-condition (Y at step S16), at step S19 it is judged whether or not the counter cnt is equal to the set count value set up in the reflection angle data n of the EEPROM 15. When judged not equal (N at step S19), the CPU 14*a* advances to step S20.

At step S20, likewise at S14, the pulse signal described above is sent to the motor driver 13*c* so that the stepping motor 13*b* is rotated so as to rotate the reflecting member 12 toward the upper limit by one step and thereafter, at step S21 the counter cnt is increased to be (cnt+1) and then, the CPU returns to step S19 and the series of the processing is repeated.

At step S19, when it is judged that the counter cnt is equal to the set count value set up in the reflection angle data n of the EEPROM 15 (Y at step 19), it is judged that the reflecting member 12 returns to the initial position indicated by the reflection angle data n of the EEPROM 15 and then, the processing is finished.

In the flow chart as explained above, the processing at step S11 corresponds to the support start detecting means and a series of the processing at the steps S13-S21 corresponds to the rotation control means. When the CPU 14*a* performs the processing, the processing at step S11 functions as the support start detecting means and a series of the processing at the steps S13-S21 functions as the rotation control means. It should be noticed that the above is an example and there may be various different embodiments depending upon the adjustment supporting range and the construction of the drive part 13.

Figure 6A:
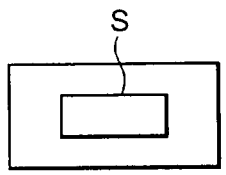
FIG. 6A shows an initial display position in a display example of a display device for a vehicle according to the present invention.

In the following, an example of action of the display device 10 for a vehicle constructed as described above will be explained with reference to an example shown in FIG. 6. For the purpose of simplification, explained is a case, in which the reflecting member 12 is set up at a reflection angle corresponding to the eye point EP which is located at the center.

When the IGN switch of the vehicle is turned on, the display device 10 for a vehicle turns on and allows the display source 11 to display an image, so that the display light L of the image is reflected by the reflecting member so as to be projected on the projection area E. As a result, the driver sees the virtual image S of the image projected on the projection area E of the windshield 3.

Figure 6B:
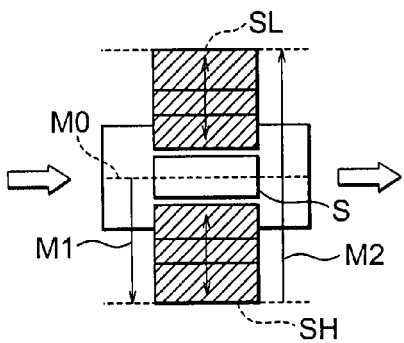
FIG. 6B is an adjustment supporting range of a virtual image in a display example of a display device for a vehicle according to the present invention.

When the positive rotation drive toward the upper limitation direction X is performed in the drive part 13, the reflecting member 12 set up at the initial display position thereof is rotated toward the upper limit direction of the adjustment supporting range until the upper limiting switch 13*e* is in an on-condition. As a result, as shown in FIG. 6B, the virtual image S at the initial display position is moved toward the upper limit so as to be seen as the upper limit virtual image SH (M1).

When the upper limiting switch 13*e* detects that the virtual image S reaches the upper limit, the reverse rotation drive toward the lower limitation direction Y is performed in the drive part 13, so that the reflecting member 12 is moved from the upper limit toward the lower limit of the adjustment supporting range. As a result, as shown in FIG. 6B, the virtual image is moved from the upper limit virtual image SH so as to be seen as the lower limit virtual image SL (M2).

Figure 6C:
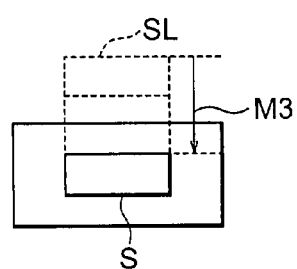
FIG. 6C is a returned display position of a virtual image in a display example of a display device for a vehicle according to the present invention.

When the positive rotation drive toward the upper limitation direction X is performed in the drive part 13, the reflecting member 12 is rotated from the lower limit of the adjustment supporting range toward the display position M0. As a result, as shown in FIGS. 6B and 6C, the virtual image is moved from the lower limit virtual image SL so as to be seen as the virtual image S (M3). Thus, by rotating the reflecting member 12 throughout the entire adjustment supporting range, the driver can see the virtual image S which moves up and down within the adjustment supporting range. Therefore, even when a driver, whose display position setting is different from that of a former different driver, uses the device, the situation, in which the display image S is partly missing or nothing can be seen by the driver, can be prevented from occurring.

According to the display device 10 for a vehicle as explained above, when a support start timing of adjusting a reflection angle of the reflecting member 12 is detected, the reflecting member 12 is controlled so as to be rotated within the adjustment supporting range on a condition that the reflecting member 12 is reflecting the display light L from the display source 11 and to be returned to the reflection angle set up before the support. Thereby, since the reflecting member 12 rotates within the adjustment supporting range, therefore the display light L reflected by the reflecting member 12 can also be moved within a range corresponding to the adjustment supporting range. As a result, the driver of the vehicle can be supported as to recognition of a display position of a virtual image, therefore the driver can be free from a trouble of adjusting a display position of the virtual image without complication and cost-up of the device.

Further, since the reflecting member 12 is controlled so as to rotate throughout the entire adjustable range, which corresponds to the eye range ER and within which the reflecting member 12 is adjustable, therefore the display light L moves throughout the entire adjustable range. That is, since the driver can see the entire range in which the image can be displayed, therefore the device can precisely support the adjustment of the display position to the driver.

In the preferred embodiment described above, the support start detecting means detects the turning-on of the IGN switch of the vehicle. However, another embodiment may be possible, for example, detecting a specific operation by the driver of the operation switch 16.

According to the present invention, when the IGN switch is turned on, the rotation of the reflection member 12 is controlled so as to be moved throughout the entire adjustment supporting range, thereby a current display position of the virtual image S and the adjustment supporting range can be recognized by a driver who has no intention to adjust the reflection angle. On the other hand, for a driver who has intention to adjust the reflection angle, that is, for a driver who operates the operation switch, a reflecting mirror may be rotated within an adjustment supporting range which is set up narrower than the range described above.

Further, in the preferred embodiment described above, the adjustment supporting range is a range corresponding to the upper limit and the lower limit of the eye range ER. However, another embodiment may be possible, for example, that the adjustment supporting range is a range set up arbitrarily or a range defined according to the initial-display position.

The aforementioned preferred embodiments are described to aid in understanding the present invention and variations may be made by one skilled in the art without departing from the spirit and scope of the present invention.

What is claimed is:

1. A display device for a vehicle comprising:
    a display source displaying an image to be seen by a driver;
    a reflecting member, a reflection angle of which is adjustable so as o reflect a display light of an image displayed by the display source toward a point within an eye range indicating a range, within which the image is visible to the driver even when an eye point of the driver shifts;
    a rotating means for rotating the reflecting member;
    a reflection angle data storing means for storing reflection angle data indicating a reflection angle at which the reflecting member is set up;
    a support start detecting means for detecting a support start timing of adjusting a reflection angle indicated by the reflection angle data stored by the reflection angle data storing means; and
    a rotation control means for controlling the rotating means so as (a) to initially rotate the reflecting member, which is reflecting the display light from the display source, throughout an entire predetermined adjustment supporting range upon turning on of an ignition switch of the vehicle and (b) to return the reflecting member to a reflection angle set before the support, said reflection angle being indicated by the reflection angle data stored by the reflection angle data storing means, in response to the detection of the support start timing by the support start detecting means.

2. The display device for a vehicle according to claim 1, wherein the adjustment supporting range is an adjustable range, which corresponds to the eye range and within which the reflecting member is adjustable, wherein the rotation control means controls the rotating means so as to rotate the reflecting member throughout the entire adjustable range.

3. A supporting method for adjusting a display position of a display device for a vehicle including:
    a display source displaying an image to be seen by a driver;
    a reflecting member, a reflection angle of which is adjustable so as to reflect a display light of an image displayed by the display source toward a point within an eye range indicating a range, within which the image is visible to the driver even when an eye point of the driver shifts; and
    a rotating means for rotating the reflecting member,
    the supporting method comprising the steps of:
    detecting a support start timing of adjusting a reflection angle at which the reflecting member is set up; and
    controlling the rotating means so as (a) to initially rotate the reflecting member, which is reflecting the display light from the display source, throughout an entire predetermined adjustment supporting range upon turning on of an ignition switch of the vehicle and (b) to return the reflecting member to a reflection angle at which the reflecting member is set up before the support, in response to the detection of the support start timing.

* * * * *